UNITED STATES PATENT OFFICE.

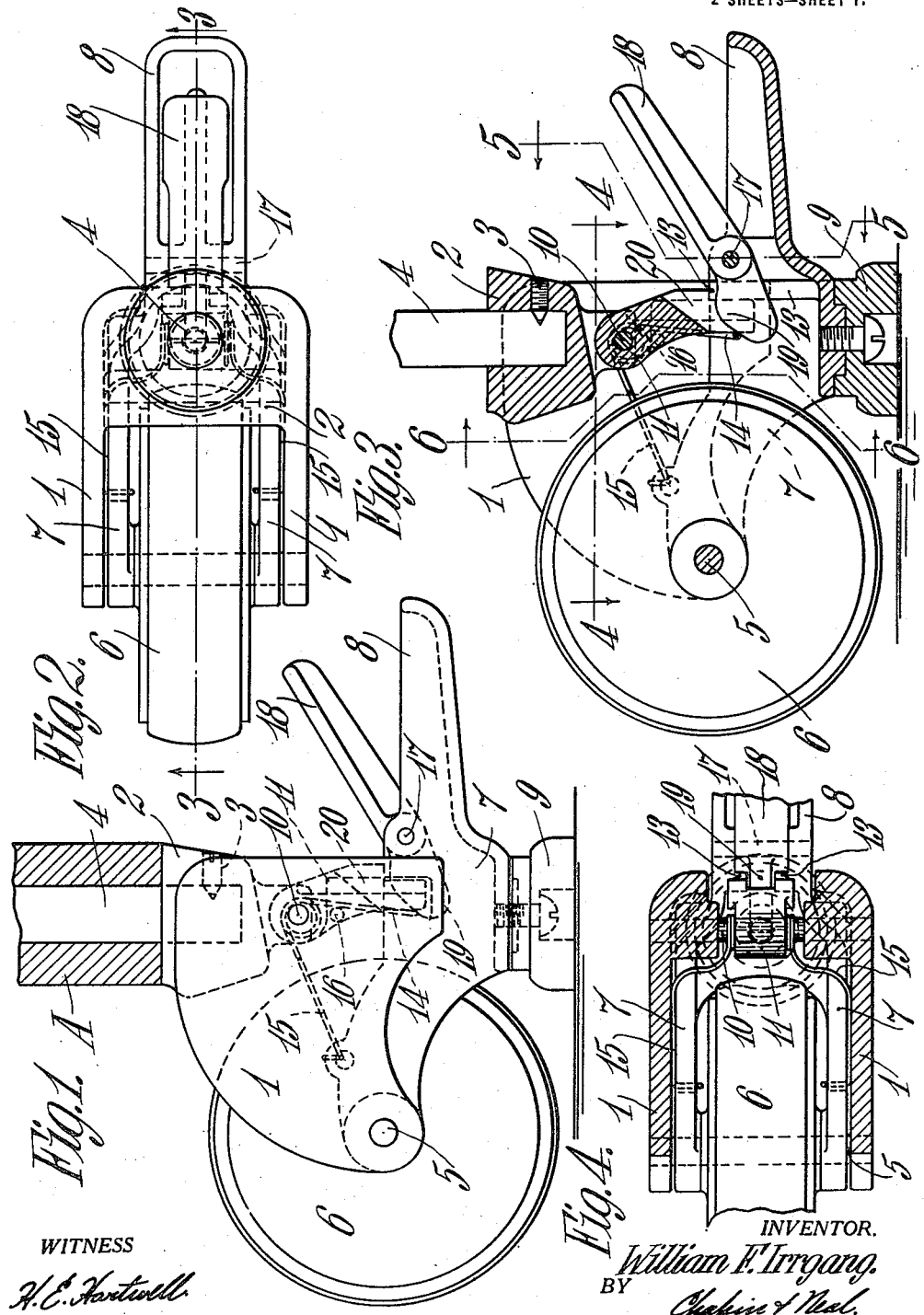

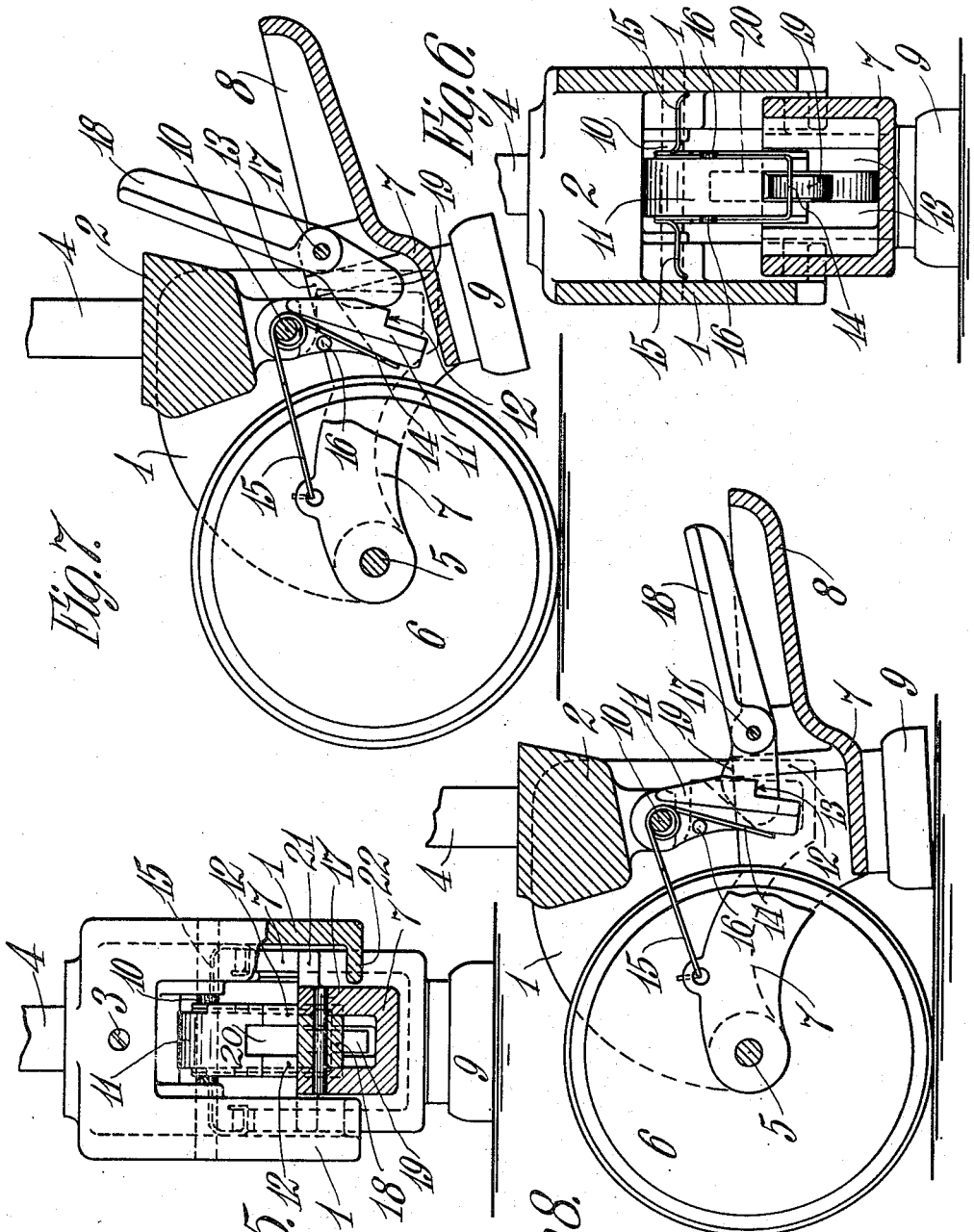

WILLIAM F. IRRGANG, OF WINDSOR LOCKS, CONNECTICUT, ASSIGNOR TO GEORGE P. CLARK COMPANY, OF WINDSOR LOCKS, CONNECTICUT, A CORPORATION OF CONNECTICUT.

CASTER.

1,174,582.

Specification of Letters Patent.

Patented Mar. 7, 1916.

Application filed November 13, 1915. Serial No. 61,392.

*To all whom it may concern:*

Be it known that I, WILLIAM F. IRRGANG, a citizen of the United States of America, and residing in Windsor Locks, in the county of Hartford and State of Connecticut, have invented certain new and useful Improvements in Casters, of which the following is a specification.

This invention relates to improvements in casters and particularly in casters of the type disclosed in the patent to W. J. Oldroyd, No. 1,092,506, granted April 7, 1914. Such casters are arranged so that the part to which the caster is attached, such as the leg of a bed, for example, may be supported from the caster wheel and, by manipulating mechanism associated with the caster, the weight of the bed may be supported independently of the wheel. Casters of this type are particularly useful in hospitals as supporting devices for beds and operating tables. Here, it is desirable to be able to roll the body supported on the wheels from point to point, but, at all other times, it is desirable to prevent the supported body from rolling, so that it is not readily displaced. This is accomplished by mechanism in the caster device, which lifts the wheel from the floor and has a part to engage the floor and form a fixed support for the bed or table. All weight is, thus, removed from the wheel itself and the life of the caster wheels is greatly lengthened, particularly, when the usual rubber tired wheels are employed.

The caster device shown in the above-mentioned patent has been successfully used in practice but has certain features relating principally to the operation of the device, which I seek to improve. For example, in one form of the invention disclosed in the above-mentioned patent, an elevating lever and a latch lever are employed, which are each always exposed in a position accessible for foot operation. Consequently, the operator must select the proper lever for the operation desired and must exercise some care and thought in the selection. Moreover, when the caster wheel is lifted from the floor, and it is desired to lower it, the latch lever is depressed, and the wheel drops to the floor. Thus, there is a fall under the weight of the body supported by the caster, which causes a considerable jar.

In the other form of the invention shown in the above-mentioned patent, the latch releasing lever is eliminated and, in its place, a dog associated with latch is substituted. By this construction, the latch is releasable by movement of the lever, and, while the device operates successfully, when properly manipulated, it requires skill and care for its operation. For example, in raising the caster wheel, the elevating lever is depressed by the operator's foot until the latch snaps in place to lock the lever and, to release the latch, the lever is still further depressed and then allowed to pass upwardly whereupon the dog in the latch forces the latter from locking engagement with the lever. To raise the caster wheel, the operator must depress the lever and stop immediately, when he "feels" the latch snap in place for a depression of the lever beyond this point would cause the release of the lever and allow the body supported by the caster to drop unexpectedly. Thus, care must be exercised to properly operate this type of caster, and this feature is, therefore, undesirable for, in practice, it is preferable to provide a substantially "fool-proof" device which will operate properly with a minimum of thought and care on the part of the operator. Furthermore, in both forms disclosed in the patent mentioned, the elevating lever, after the caster wheel has been lowered must be lifted upwardly by the operator before it is latched. These disadvantages are eliminated in my improved caster.

An object of the invention is to provide a caster device of the class described, including a lever arranged to lift the caster wheel, a latch to hold the wheel lifted, and a latch releasing lever, in which the two operating levers are interconnected and arranged so that an actuation of one thereof automatically brings the other into position for the next succeeding operation and removes the lever actuated to a point not conveniently accessible, whereby the device may be properly operated without thought on the part of the operator.

Another object of the invention is to provide, in a caster device of the type described, an improved coöperative arrangement of the elevating and latch releasing levers so that, as the latter is operated to release the latch, continued movement brings the elevating lever into play, whereby the operator may ease the body supported by the caster to the floor and thus avoid undesirable jar.

Another object of the invention is to provide in a caster device of the class described a single spring interconnecting the latch and elevating lever which is arranged to automatically throw the former into locking position with the latter and which is engageable by a latch releasing lever to throw the latch out of engagement.

A further object is to provide in a caster device of the elevatable type a lever for raising the caster wheel, which, when not in use to hold the wheel from the floor, is automatically drawn up and held in position away from the floor.

Other objects and advantages will appear in the following description and annexed claims.

Referring to the drawings as illustrating one preferred manner in which the invention may be put to use Figure 1 is a side elevational view of the caster with the wheel thereof shown in elevated position; Fig. 2 is a plan view thereof; Fig. 3 is a sectional elevation taken on the line 3—3 of Fig. 2 and looking in the direction of the arrows; Fig. 4 is a partial sectional plan view taken on the line 4—4 of Fig. 3 and looking in the direction of the arrows; Fig. 5 is a sectional elevation taken on the line 5—5 of Fig. 3 and looking in the direction of the arrows; Fig. 6 is a sectional elevation taken on the line 6—6 of Fig. 3 and looking in the direction of the arrows; Fig. 7 is a view generally similar to Fig. 3 with the wheel shown in lowered position; and Fig. 8 is a view similar to Fig. 7 illustrative of the relative positions of the parts in passing from the elevated to the lowered position of the wheel.

Referring to these drawings, the caster frame comprises a casting which has spaced wings 1 connected together at the top by an integral bridge portion 2. Fixed in the latter by a set screw 3 is a vertical pin 4 which is adapted to fit into a socket in the leg A of the bed or table to be supported. At one corner of the wings 1 and offset from the vertical axis of the pin 4 is mounted an axle 5 for a caster wheel 6 which may be of any desirable construction but is preferably provided with a rubber tread, as shown.

Pivotally mounted on the axle 5 within the wings 1 is a lever 7, which is forked to receive the wheel 6, as shown in Figs. 2 and 4 and has a part 8 extending beyond the wings 1 for foot operation. Secured to the lever 7 intermediate its ends and vertically below the pin 4 is a foot 9 to engage the floor, and this foot is preferably of rubber or the like to prevent slipping on the floor. The portions of the lever 7 disposed to the right of the wheel 6 are substantially U-shaped in cross-section so that a recess open at the top is formed, as clearly shown in Figs. 3, 5, and 6. Pivotally mounted at 10 on the wings 1 and vertically below the pin 4 is a latch 11 which is movable within the recess in lever 7 and has a shoulder 12 adapted to engage with two projections 13 inwardly extending from the walls of the lever 7, as shown in Figs. 3, 4, and 6. The latch 10 is constantly forced outwardly toward the projections 13 by a spring, which comprises a U-shaped portion 14 to rest against the rear surface of latch 11, as best shown in Fig. 6, two upward extensions loosely coiled around the pin 10 on either side of the latch 11, and two laterally spaced portions 15. The latter extend from the coils on pin 10 on either side of the wheel 6, as best shown in Fig. 4, and are hooked into ears formed in the lever 7, as shown in Fig. 7. Pins 16 project outwardly from the latch 11 and are arranged rearwardly and in the path of the spring 14, as best shown in Figs. 6, 7, and 8. Pivotally mounted on a pin 17 between the spaced walls of lever 7 is a latch releasing lever 18. The latter has a cam portion 19 which extends between the projections 13 on lever 7 and lies within a slot 20 in the latch 11. To prevent the lever 7 from falling downwardly to such an extent that the latch 11 might fly outwardly over the top of the lever, lugs 21 are formed on either side of the latter which will engage inturned lugs 22 on the wings 1 when the table or bed supported by the caster is for any reason lifted from the floor.

The operation of the improved caster will now be described, and it will be assumed that the wheel 6 is in its lowered position, as shown in Fig. 7. With the parts so positioned, the weight of the body supported from legs A is acting through the wheel 6, and the supported body may be rolled along the floor to any position desired. To prevent the supported body from rolling after it has been moved to its proper position, the operator depresses the part 8 with his foot which moves the lever 7 downwardly against the tension of the spring 15. The foot 9 is thus brought into engagement with the floor, as shown in Fig 8, and continued pressure on the lever 7 will raise the wheel 6, its frame, and the leg A from the floor with the latter as a fulcrum. As the caster frame is carried upwardly relatively to the lever 7, the shoulder 12 of latch 11 is finally forced over the upper surfaces of the projections 13 by spring 14. The parts are thus brought into the relative positions shown in Figs. 1 and 3, and the weight of the supported body is removed from wheel 6 and carried by the button 9 of lever 7 through the intermediary of latch 11. It is to be noted that the force due to the weight of the body supported on legs A is transmitted substantially in a vertical straight line to the floor so that the parts are generally under compression with no undue stress to deflect the parts. It should also be noted that, when the wheel 6 is in lowered position, as shown in Fig. 3, the portion 8 of lever 7 is the only part which is conveniently accessible to the foot of the operator, but, when the wheel 6 is elevated as shown in Figs. 1 and 3, the lever 18 is brought into more accessible position for foot operation than is the member 8. Thus, the actuating part for the next operation is brought into convenient position by the preceding operation so that the proper lever is depressed instinctively by the operator.

To lower the wheel 6 to the floor, the operator depresses the lever 18 and the cam portion 19, which, as shown in Fig. 3, bears against the spring 14, forces the latter rearwardly. Continued depression of the lever 18 causes it to come to rest within the portion 8 of lever 7 so that the pressure exerted on the lever 18 is also exerted on the lever 7. The latter is then depressed slightly to take the weight from the latch 11, and the spring 14, which has been flexed rearwardly as described, acts on the pins 16 to withdraw the latch 11. Thereafter, the leg A, frame 1, and wheel 6 may be eased to the floor by the operator as his foot bears on the portion 8 of lever 7 for this purpose. The parts then are in the relative positions shown in Fig. 8, and it is to be noted that the portion 14 of the spring is under compression. The angle between the two limbs 14 and 15 of the spring is less than that shown in Fig. 3. Consequently, when the operator withdraws his foot from the member 8, these two limbs tend to spread apart, but, as the limb 14 is restrained from movement by the latch 11, the forward part of which rests against the projections 13, the limb 15 is the only one which can move. The latter thus has a tendency to fly upwardly, whereby the lever 7 is automatically lifted to the position shown in Fig. 8. As this upward movement of the lever 7 takes place, the latch 11 is moved still farther inwardly toward the wheel by the projections 13 so that the spring is still compressed to a sufficient degree to hold the lever 7 in its raised position. It is to be noted that the lever 18 is tilted upwardly by the coaction of the cam extension 19 with the upper surface of the slot 20, so that the lever 8 only is exposed for the next operation, which is the lifting of the wheel 6 from the floor as already described.

Thus, an improved caster device has been provided, which is adapted for convenient and efficient use and is arranged for proper operation with a minimum of care and attention by the operator.

It is recognized that various modifications may be made in the embodiment described for illustrative purposes without departing from the scope of the invention, which is defined by the annexed claims rather than by the foregoing description.

What I claim is—

1. A caster device, comprising, in combination, a frame, a lever pivoted thereto having a depending portion to engage the floor and an extended portion to swing the lever on the floor as a fulcrum to lift the frame, and means automatically operable when the frame is lowered to hold the lever away from the floor.

2. A caster device, comprising, in combination, a frame, a lever pivoted thereto having a depending portion to engage the floor and an extended portion to swing the lever on the floor as a fulcrum to raise the frame, means to hold the frame in raised position, and a device associated with the lever to release said means, said lever and device constructed and arranged so that pressure on said device releases said means and continued movement of the device brings pressure on said lever, whereby the frame may be eased downwardly to the floor.

3. A caster device, comprising, in combination, a frame, a lever pivoted thereto having a part to engage the floor and an extended portion to swing the lever on the floor as a fulcrum to raise the frame, a latch to hold the frame in raised position and a second lever associated with the first-named lever to release the latch to lower the frame, said levers constructed and arranged for coöperative action so that an operation of one thereof brings the other into position for actuation to cause the next succeeding operation.

4. A caster device, comprising, in combination, a frame, a wheel and a lever for raising the frame pivoted thereto, a latch pivoted to the frame and arranged automatically to engage the lever as the latter is moved to hold the frame in raised position, and a second lever pivoted to and adapted to be moved within the first mentioned lever and arranged when depressed to release the latch, said second lever arranged on continued movement to lie within the first-named lever so that pressure applied to the former is transferred automatically to the latter, whereby when the latch is released, the frame may be gradually lowered to the floor under the control of the operator by pressure on the first-named lever.

5. A caster device, comprising, in combination, a frame, a wheel and a lever for raising the frame pivoted thereto, a latch pivoted to the frame, a spring connecting the latch and lever and arranged on movement of the latter to force the latch into engagement with the lever to hold the frame in raised position, and an arm pivoted to the lever and arranged when depressed to deflect said spring and release the latch, said arm arranged to drop within the lever so that pressure on the former is transferred to the latter, whereby the frame may be lowered under the control of the operator.

6. A caster device, comprising, in combination, a frame, a wheel and a lever for raising the frame pivoted thereto, said lever having a depending part to engage the floor and an extended portion to swing the lever on the floor as a fulcrum, a latch pivoted to the frame to engage the lever as the latter is moved to hold the frame in raised position, a latch releasing arm pivoted to the lever, and means to move the latch comprising a spring having a limb connected to the lever and a limb to bear on the latch, said spring having a connection intermediate its ends with the frame, all constructed and arranged so that the spring automatically forces the latch into engagement with the lever as the latter is moved downwardly, whereby the frame may be held raised, and so that the spring will automatically raise the lever away from the floor when the frame is lowered, said spring also arranged to be compressed by actuation of said arm to withdraw the latch from the lever.

WILLIAM F. IRRGANG.